United States Patent [19]

Dougherty et al.

[11] Patent Number: 4,789,343

[45] Date of Patent: Dec. 6, 1988

[54] ELECTRICAL CONNECTOR SYSTEM FOR ADJUSTABLE AUTOMOTIVE SUSPENSION COMPONENTS

[75] Inventors: Michael J. Dougherty, Lansdale; Robert E. MacMullin, Exton, both of Pa.

[73] Assignee: Microdot Inc., Darien, Conn.

[21] Appl. No.: 105,040

[22] Filed: Oct. 6, 1987

[51] Int. Cl.⁴ .......................................... H01R 13/639
[52] U.S. Cl. ..................... 439/34; 439/358; 439/467; 439/596
[58] Field of Search .......... 439/34, 660, 271, 357–358, 439/465, 467, 596, 445, 447

[56] References Cited

U.S. PATENT DOCUMENTS

| | | | |
|---|---|---|---|
| 3,336,565 | 8/1967 | Crimmins | 439/467 |
| 3,497,866 | 2/1970 | Patton, Jr. | 439/660 |
| 3,523,269 | 8/1970 | Witek, Jr. et al. | 439/358 |
| 3,747,048 | 7/1973 | Johnson et al. | 439/276 |
| 4,005,922 | 2/1977 | Burkhart et al. | 439/465 |
| 4,526,401 | 7/1985 | Kakizaki | 280/707 |
| 4,640,567 | 2/1987 | Lundergan et al. | 439/271 |

FOREIGN PATENT DOCUMENTS 372361 11/1963 Switzerland .......... 439/445

Primary Examiner—John McQuade
Attorney, Agent, or Firm—Lyman R. Lyon

[57] ABSTRACT

An improved electrical connector system for connecting an electronic control system to electrically adjustable automotive suspension components, such as shock absorbers and MacPherson struts, features ease of connectibility and serviceability, superior electrical insulation, fewer individual components, and increased reliability. More specifically, the connector assembly features recessed, axially elongated contacts; integral latching strain relief caps; positive keying surfaces to ensure proper connector orientation; latching arms for removably attaching the connector system to the suspension component; and at least one seal radially disposed between the connector system and suspension component housing to prevent moisture penetration thereinto.

34 Claims, 3 Drawing Sheets

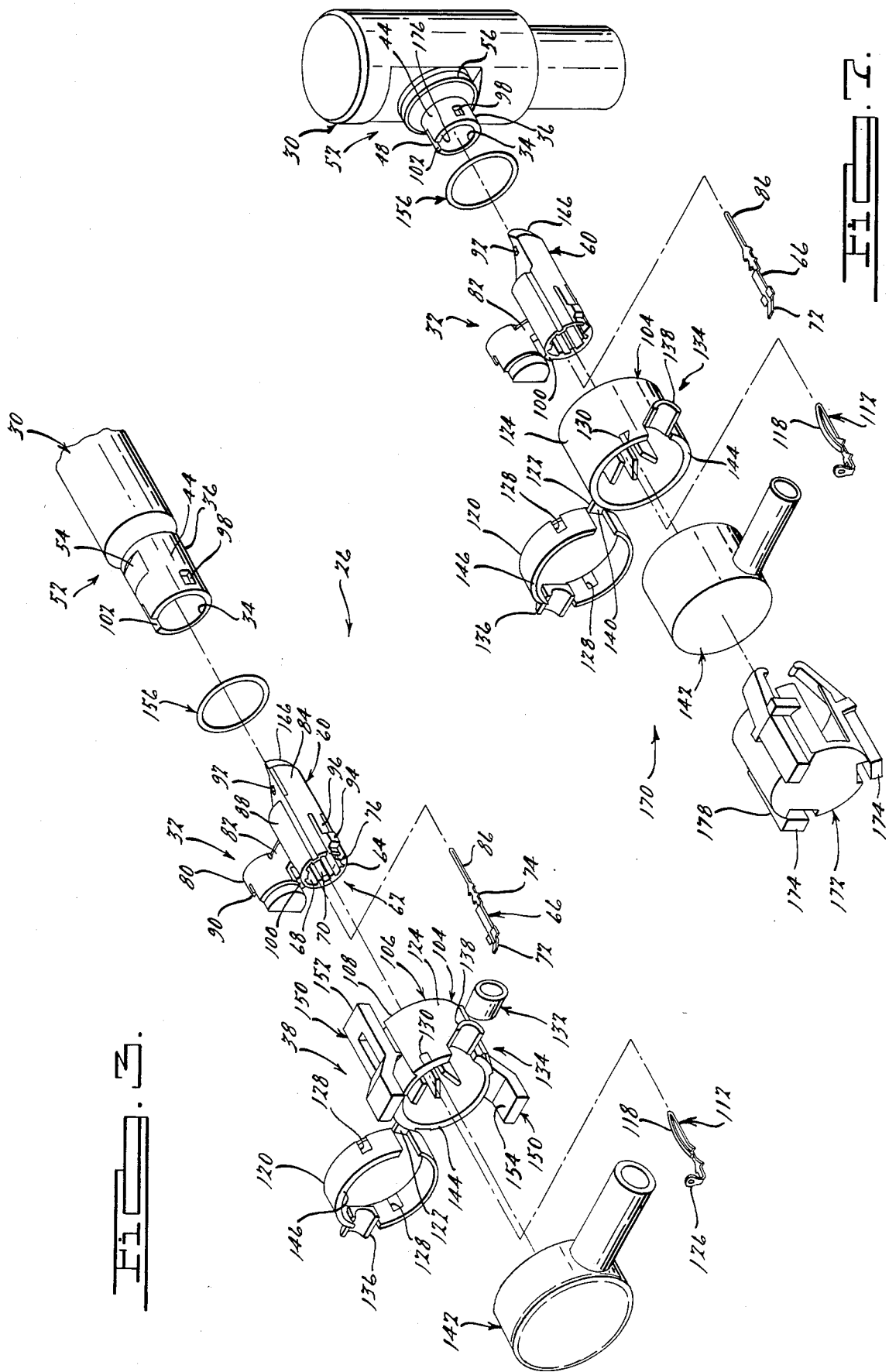

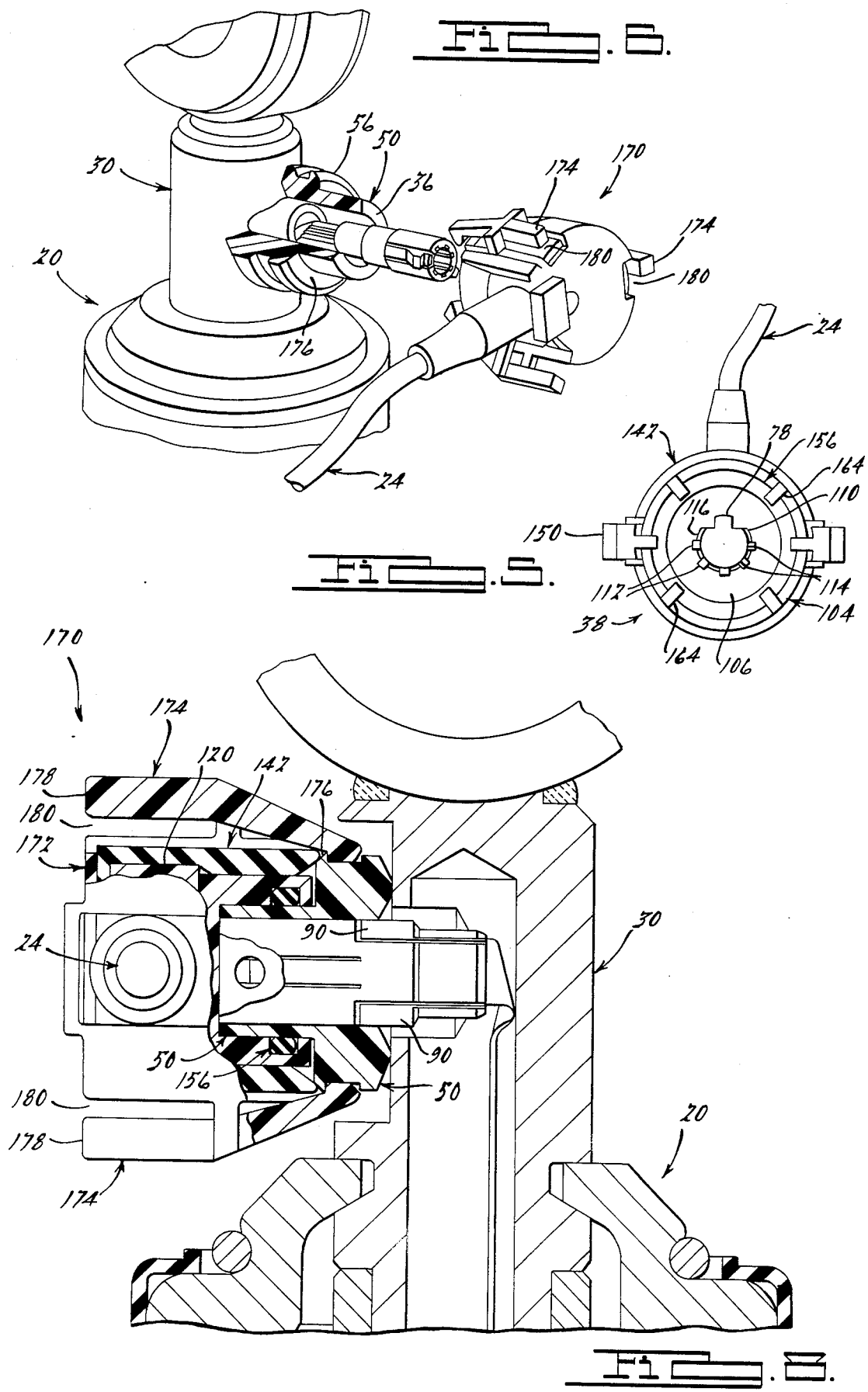

ELECTRICAL CONNECTOR SYSTEM FOR ADJUSTABLE AUTOMOTIVE SUSPENSION COMPONENTS

BACKGROUND OF THE INVENTION

The instant invention relates to electrical connectors for connectably transferring power and other electrical signals from a remotely stationed control unit to a plurality of adjustable automotive suspension components, such as electrically adjustable damping-force hydraulic struts and shock absorbers, controlled thereby.

U.S. Pat. No. 4,526,401 to Kakizaki et al. teaches an "Electrical Control System For Adjustable Shock Absorbers" wherein low-voltage, low-current electronic information is exchanged between an electrically adjustable shock absorber and electronic control means therefor that is positioned remotely therefrom and connected thereto via an electrical harness. An electrical connector system is needed between the shock and control means that is firmly attachable to the shock while providing ease of connectibility and serviceability, and while being equally able to withstand the rigors of underhood and wheel well environments, which include exposure to mechanical shock, vibration, impact, and severe moisture conditions.

For example, standards sanctioned by the Society of Automotive Engineers require continuity of operation of such components after exposure to humidity, salt atmosphere, fluid immersion, splash with numerous chemicals and oils, and resistance to dust, sand, and gravel bombardment. Moreover, it is generally accepted that automotive components must operate over a temperature range of −40° C. to 85° C. It will also be noted that automotive suspension components are typically considered zero maintenance items. Standard industry warranties extend for a period of five or more years, or in excess of 50,000 miles, of vehicular use. Thus, electrical connectors for use with such components must be particularly hearty.

Additionally, an electrical connector system for underhood use must be one of low profile design, as space available above a MacPherson strut suspension component is typically restricted by the proximity of the engine compartment hood. Similarly, with regard to a rear shock application, connector system size is limited by the space available within the wheel well. Moreover, while an electrical connector for a strut may be axially mounted upon the upper end of the strut stem, the typical rear shock is secured to the automobile chassis by an axially situated upper mounting loop, thereby requiring a connector system suitable for mounting thereon in a radial direction with respect thereto, i.e., mounted perpendicular to the shock absorber shaft.

The prior art teaches a plug and socket combination for use with electrically adjustable shock absorbers wherein a plurality of cantilevered contact beams projecting axially within the socket mate with recessed contact surfaces on the axially opposed surface of the plug. The flexible circuit leading to the motor within the shock is soldered to the contacts protruding from the opposite end of the socket, whereafter a strain-relief cap is pressed onto, and then glued to the socket and flexible circuit. An O-ring is positioned about the outer stepped surface of the socket, whereafter the socket is press-fit into a bore in the shaft of the shock and glued thereto, thereby compressing the O-ring between the outer surface of the socket and the internal surface of the shaft bore.

The wires leading to the plug are secured to the contacts therein by pressure crimp. An elastomeric cover encompasses the entire plug assembly and extends axially therefrom so as to encompass a portion of the suspension component shaft subsequent to the mating of the plug and socket. A circular snapping arm thereafter secures the plug about the shaft. A second moisture barrier comprising a resilient sealing element is also disposed between the axially opposed, mating surfaces of plug and socket during the mating thereof.

Unfortunately, the connector system taught by the prior art is replete with shortcomings: the connection of the flexible circuit to the jack contacts, the securing of the cap thereto, and the installation of the jack within the shaft bore are painstaking and timeconsuming; consuming; the serviceability of the prior art connector system is greatly impaired due to the use of glue therein; the cantilevered contact beams of the socket are vulnerable to transverse loading during connection and service, whereupon the resultant bending and/or breaking of the contact beams may render the connector system inoperable; arcing and other electrical disruptions between the cantilevered socket contact beams can adversely affect connector reliability and performance, as there are no insulating barriers interposed therebetween; the wires connected to the plug contacts are not provided with any strain relief and, hence, the connections therebetween are susceptible to failure due to mechanical work thereupon; the embrittlement of the glue utilized by the prior art at cold temperatures diminishes the impact resistance of the prior art connector system; and the moisture barriers utilized therein are unable to provide a complete seal, thereby allowing moisture to seep into the suspension component. Additionally, it is to be noted that the prior art has been unable to accommodate suspension components which utilize an axially-disposed mounting loop which fail to provide an axially extending mounting stem for use with the connector system taught by the prior art.

SUMMARY OF THE INVENTION

The purpose of the instant invention is to provide an electrical connector system that when installed and connected would be firmly attached to an adjustable automotive suspension component while providing a complete moisture barrier thereto.

It is also the purpose of the instant invention to provide an electrical connector system that is installed and connected, and disconnected for service, with operator ease.

A further purpose of the electrical connector system of the instant invention is to provide protection against contact damage during connection and service while providing strain relief for the attached wiring and/or flexible circuits utilized therein.

A further purpose of the connector system of the instant invention is to provide a low profile, high packaging density connector system able to withstand the rigors of automotive underhood and underbody environments.

A further purpose of the connector system of the instant invention is to provide a connector system adaptable for mounting either axially or radially on the adjustable suspension component.

The connector system of the instant invention comprises a female connector comprising a first, or female, axially elongated, electrically insulative connector housing having a plurality of axially extending electrical contact elements radially outwardly supported by an internal surface thereof, and adapted to be retained in a bore in a cylindrical projection formed in the housing of an adjustable suspension component; and a male connector comprising a second, or male, axially elongated, electrically insulative connector housing having a plurality of axially extending electrical contact elements radially inwardly supported by an axial projection thereof, a moisture boot which encompasses the male connector housing, and latch means on the male connector housing for removably attaching the male connector to the cylindrical projection of the suspension component housing. Both female and male connectors are provided with strain relief means whereby the mechanical work on the wires connected to the contact elements thereof is reduced. Sealing means is radially disposed between the male connector housing and the cylindrical projection of the suspension component housing, whereby a moisture-proof seal is obtained therebetween.

Where particularly harsh environmental conditions are to be encountered, and where additional clearance is available above the housing of the adjustable suspension component, the moisture boot extends axially so as to encapsulate the entire male connector housing, thereby increasing connector system resistance to moisture penetration. The moisture boot engages with the suspension component housing to generate a second moisture-proof seal between the male connector assembly and the housing. To accommodate the full-length moisture boot, and to provide greater connector system impact resistance, a separate cap having latching means thereon and which fully encompasses the moisture boot is employed to removably attach the connector system to the suspension component housing.

BRIEF DESCRIPTION OF THE DRAWINGS

FIG. 3 is an exploded view in perspective of the connector system of FIG. 2;

FIG. 5 is an end view of the male connector along line 5—5 of FIG. 2;

FIG. 6 is a partially exploded view in perspective of an alternate embodiment of the connector system of the instant invention, to be mounted radially on an additional cylindrical projection formed on a loop-mounted shock absorber;

FIG. 7 is an exploded view in perspective of the connector system of FIG. 6; and FIG. 8 is a view similar to that of FIG. 4 of the connector system of FIG. 6.

DETAILED DESCRIPTION OF THE PREFERRED EMBODIMENT OF THE INVENTION

Figure 1:
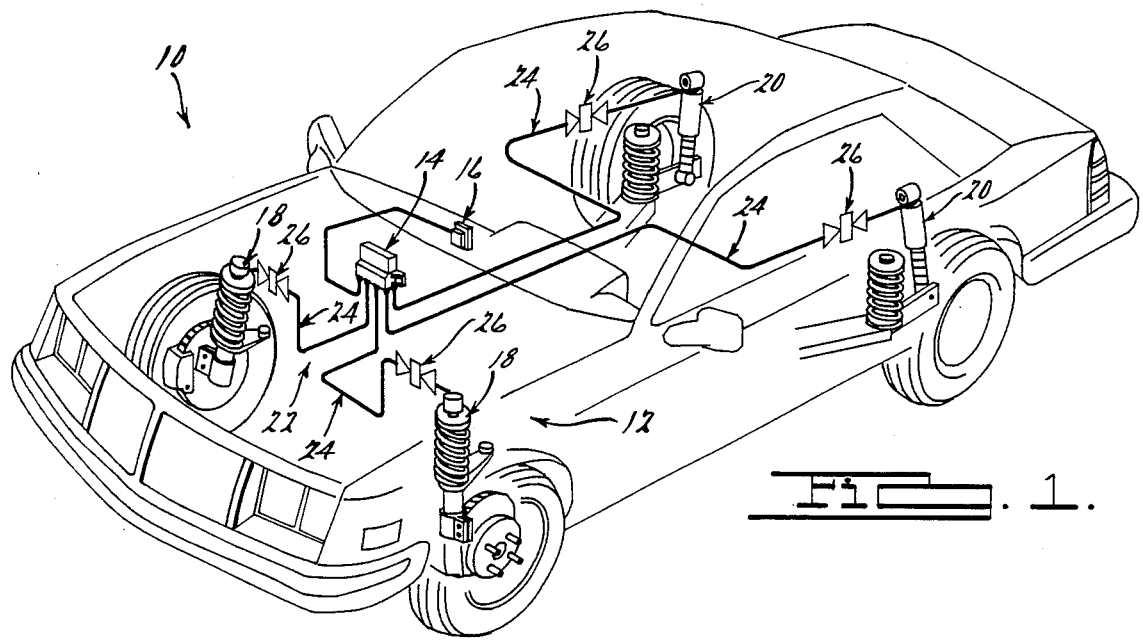
FIG. 1 is an outline in perspective of an automobile, partially in schematic, showing the components of an electronically controlled, adjustably damped automotive suspension system.

An automobile 10 is shown in perspective in FIG. 1 as having incorporated therein an electronically controlled, adjustably damped suspension system 12 comprising an electronic control unit 14 having an operator control switch 16 connected thereto; a plurality of electrically adjustable suspension components, namely, a pair of electrically adjustable MacPherson struts 18 and a pair of electrically adjustable shock absorbers 20; and an electrical harness 22 connecting the control unit 14 to the adjustable suspension components 18 and 20 comprising four sets of control wires 24 and a like number of electrical connector systems 26 constructed in accordance with the instant invention.

By way of example, each adjustable suspension component 18 and 20 is constructed in accordance with U.S. Pat. No. 4,526,401 to Kakizaki et al., referred to hereinabove. Hence, during system operation, the logic-based control unit 14 provides current and voltage via control wires 24 to drive 12 volt DC logic-driven positioning motor (not shown) within the adjustable struts 18 and shocks 20, which in turn provide feedback to the control unit 14 regarding the instantaneous angular position of each motor output shaft and the hydraulic valve (not shown) operatively associated therewith. It will be appreciated, however, that the electrical connector system 26 of the instant invention is suitable for use with electrically operated adjustable suspension components of differing design and/or function, such as adjustable spring-rate suspension components, wherein an exchange of electronic information between the adjustable suspension component and a remotely situated control unit is required.

Figures 2, 4:
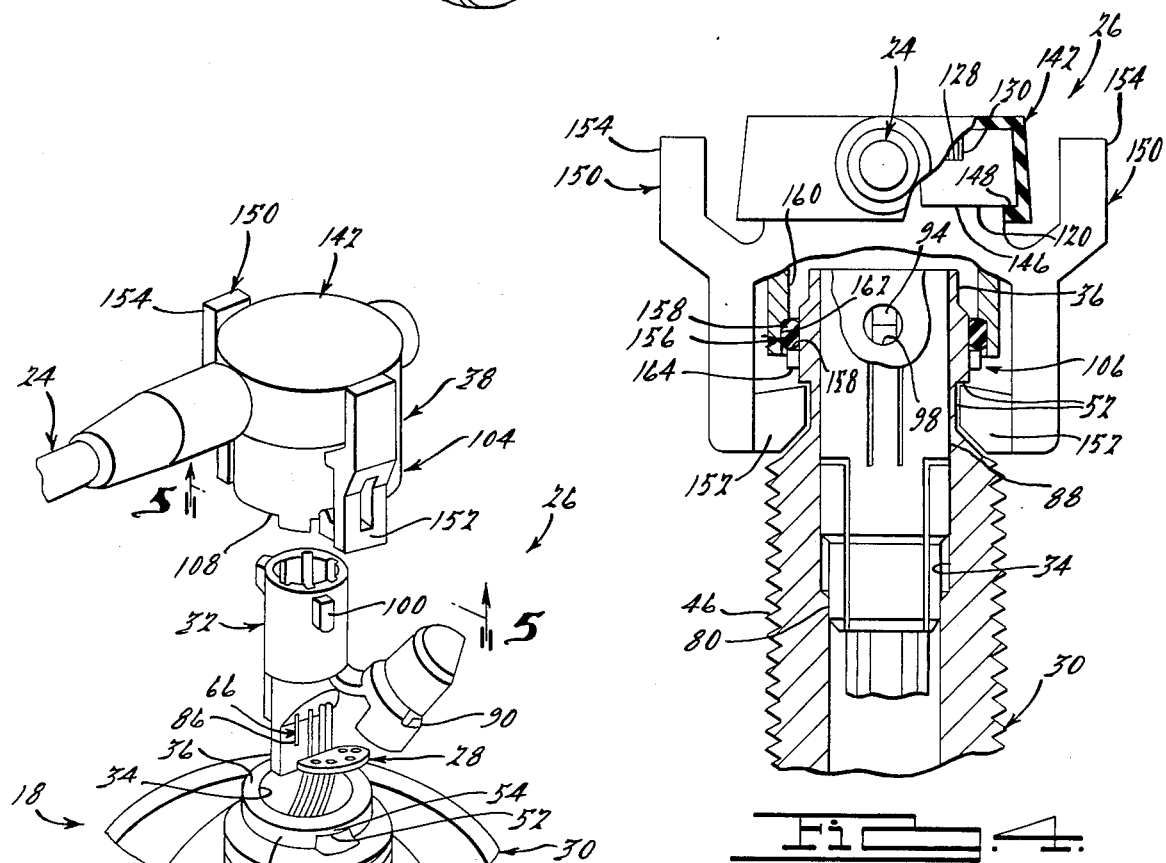
FIG. 2 is a partially exploded view in perspective of a connector system constructed in accordance with the instant invention, to be mounted axially on the mounting stem of a MacPherson strut.
FIG. 4 is a view in cross-section of the connector system of FIG. 2.

As clearly illustrated in FIG. 2 of the drawings, an electrical connector system 26 constructed in accordance with the instant invention releasably connects each set of control wires 24 extending from the control unit 14 with the set of control wires, herein disposed of as a flexible circuit 28, extending from within the housing 30 of each of the adjustable suspension components 18 and 20.

Referring to FIGS. 2-5, the connector system 26 generally comprises an axially elongated female connector 32 to be removably secured in the bore 34 of an outwardly extending cylindrical projection 36 of a suspension component housing 30, and an axially elongated male connector 38 removably attachable to the suspension component housing 30 having an O-ring moisture seal 156 incorporated therein to be radially disposed between an internal surface 160 of the male connector 38 and an external surface 44 of the suspension component housing 30 upon engagement therewith.

It is to be noted that the cylindrical projection 36 of the suspension component housing 30 may comprise the mounting stem 46 thereof, as in the case of a stud-mounted shock or the MacPherson strut 18 shown in FIGS. 2-4, or an additional projection 48 formed thereon solely for the purpose of attaching the electrical connector system 26 of the instant invention thereto, as in the case of the loop-mounted shock absorber 20 shown in FIGS. 6-8. The additional projection 48 on loopmounted shock 20 may additionally comprise a cylindrical adapter shaft 50 that is permanently mounted thereupon for use with the connector system 26 of the instant invention, as shown in FIG. 6. It will also be noted that each suspension component housing 30 is provided with a plurality of latching surfaces 52 thereon, as by providing the cylindrical projection 36 thereof with a plurality of outwardly extending ears 54 or an annular, radially outwardly extending flange 56, as shown in FIGS. 3 and 7, the purpose of which is further described hereinbelow.

More specifically, the female connector 32 comprises a first axially elongated connector housing 60 formed of an electrically insulative material such as nylon and having a cavity 62 formed in an axially disposed end 64 thereof. A plurality of axially extending, electrically conductive contact elements 66 are retained as by press-fit in axially extending recesses 68 formed in the internal surface 70 of the cavity 62, whereby the contact elements 66 are radially outwardly supported by the female connector housing 60. The contact elements 66 are metallic, preferably being formed of brass, and have a forward mating section 72 and a positioning collar 74. Since the housing 60 acts as an insulating barrier interposed between adjacent contact elements 66, the contact elements 66 are protected from damage during connection and servicing of the connector system 26 while preventing arcing and other electrical disruptions therebetween.

The female connector 32 is also provided with an internal keying surface, herein disposed of as a axially extending groove 76 formed in the internal surface 70 of cavity 62 of the female connector housing 60, for use with a corresponding keying surface 78 on the male connector 38 to ensure the proper orientation therebetween, as further described hereinbelow.

The female connector 32 also has a strain relief cap 80 integrally formed on the female connector housing 60 and connected thereto by a radially outwardly extending peripheral hinge 82. The hinged cap 80 is cammed into axial alignment with the body portion 84 of the female connector housing 60 subsequent to the connection of the flexible circuit 28 to the free ends 86 of the contact elements 66 encompassed thereby so as to generate a smooth external surface 88 on the female connector 32 while placing the cap 80 in contiguity with the flexible circuit 28. The hinged cap 80 is thereafter latchably secured to the body portion 84 of the female connector housing 60 as through use of the diametrical walls 90 of the cap 80 as flexible snaps in combination with diametrically opposed barbs 92 formed on the body portion 84 of the female connector housing 60. The resultant smooth external surface 88 facilitates installation of the female connector 32 into the cylindrical projection 36 of the suspension component housing 30. Moreover, the flexible circuit 28 is thus contained and engaged by the hinged strain relief cap 80 so as to reduce the mechanical work exerted upon the connections due to relative movement between the flexible circuit 28 and the female connector housing 60.

Finally, the female connector 32 is removably secured within the cylindrical projection 36 of the suspension component housing 30 as by a radially outwardly extending tang 94 formed on an axially extending, radially inwardly yieldable cantilevered snapping arm 96 formed integrally with the female connector housing 60 and engagable with a correspondingly opposed notch 98 formed in the cylindrical projection 36 of the suspension component housing 30. Additionally, the female connector 32 has an external polarizing key 100 which is engageable with a complementary slot 102 formed in the periphery of the cylindrical projection 36 of the suspension component housing 30, whereby relative rotational motion therebetween is prevented.

The male connector 38 of the connector system 26 of the instant invention comprises a second axially elongated connector housing 104, also formed of an electrically insulative material such as nylon, having a cavity 106 formed in an axially disposed end 108 thereof. An axially extending projection 110 is disposed centrally of the cavity 106, and a plurality of axially extending, electrically conductive contact elements 112 are radially inwardly supported by the central projection 110 in axially extending recesses 114 formed in the outer surface 116 thereof, and which are retained therein as by a press-fit. As with the female connector 32, an insulating barrier is thus interposed between adjacent contact elements 112 to protect the contact elements 112 while increasing connector system reliability and connectibility.

Each male contact element 112 is preferably formed of a metal, such as tempered phosphorous bronze, capable of bending 180 degrees on itself so as to generate a resiliently yielding portion 118 thereof engageable with the forward mating section 72 of a female contact element 66, whereby a positive connection therebetween is ensured. Preferably, a tin plating is also applied to each male contact element 112 so as to ensure good conductivity, solderability and corrosion resistance.

The male connector 38 is provided with an internal keying surface, herein disposed of as a polarizing key 78 projecting radially outwardly from the outer surface 116 of the central projection 110 of the male connector housing 104. The polarizing key 78 engages with the internal groove 76 of the female connector housing 60 upon the mating of female and male connectors 32 and 38 so as to ensure the proper orientation therebetween.

The male connector 38 also has a strain relief cap 120 integrally formed on the male connector housing 104 and connected thereto by a radially outwardly extending peripheral hinge 122 in a manner similar to that found on the female connector 32. And, as with the female connector 32, the hinged cap 120 of the male connector housing 104 is cammed into axial alignment with the body portion 124 thereof subsequent to the connection of the set of control wires 24 extending from the control unit 14 to the free ends 126 of the male contact elements 112. The control wires 24 are thus contained and engaged by the hinged strain relief cap 120 so as to reduce the mechanical work exerted upon the connections due to relative movement between the wires 24 and the male connector housing 104.

In contradistinction to the hinged strain relief cap 80 of the female connector 32, which is cammed into its final position about the body portion 84 of the female connector housing 60, the hinged cap 120 of the male connector housing 104 is first cammed into axial alignment with the body portion 124 of the male connector housing 104 and subsequently moved axially in relation thereto so as to engage a plurality of circumferentially spaced slots 128 formed in the cap 120 with complementary barbs 130 formed on the body 124 of the housing 104, whereby the hinged cap 120 is latchably secured thereto. In addition, a crimp ring 132 is crimped about the male connector's tubular wiring outlet 134 generated by the mating radially outwardly extending arcuate flanges 136 and 138 formed on the hinged cap 120 and male connector housing body 104, respectively, whereby additional strain relief for the set of control wires 24 leading into the male connector 38 is provided.

Subsequent to the engagement of barbs 130 and slots 128, the axially collapsed hinge 122 of the male connector housing 104 projects radially outwardly, thereby providing a tang 140 to mechanically engage with and thereafter retain a moisture boot 142 which partially encompasses the free end 144 of the male connector housing 104. The moisture boot 142 is formed of santoprene thermoplastic rubber or other material of similar insulative capacity and environmental resistance. It is to be noted that the axially disposed edge surface 146 of the hinged cap 120 interlockingly engages with a complementary surface 148 formed internally of the moisture boot 142 to further secure the moisture boot 142 about the male connector housing 104.

The male connector 38 is provided with a pair of axially extending, diametrically opposed latches 150 integral with the male connector body 104. The rsiliency of the nylon material of the housing 104 is such that the fingers 152 of the latches 150 can be cammed outwardly by pressing radially inwardly on latch arms 154. Upon assembly of the connector system 26, the latch fingers 152 cooperate with the complementary latch surfaces 52 formed on the suspension component housing 30 to removably attach the male connector 38 and, hence, the connector system 26, thereto.

Finally, an O-ring 156 is disposed internally of the male connector housing cavity 106 to effect a complete moisture seal between the male connector 38 and the suspension component housing 30 upon assembly of the connector system 26. The O-ring 156 is retained in the cavity 106 by a plurality of axially disposed surfaces 158 generated on the internal surface 160 thereof as by the combination of a circumferential groove 162 formed therein and a plurality of radially inwardly extending tabs 164 formed thereon, as shown in FIG. 4.

During connector system assembly and installation, female contact elements 66 are press-fit into the recesses 68 in the female connector housing cavity 62, and the flexible circuit 28 extending from within the suspension component housing 30 is soldered to the free ends 86 of the female contact elements 66. The hinged strain relief cap 80 is then pushed over the soldered connections and latchably secured about the end 166 of the female connector housing 60, whereafter the cap 80 functions as a strain relief for the flexible circuit 28, as well as a protective cover for free ends 86 the contact elements 66. The female connector 32 is then inserted into the bore 34 of the cylindrical projection 36 of the suspension component housing 30 as dictated by the engagement of the external polarizing key 100 and slot 102, and removably secured therein by the engagement of the tang 94 of resilient snapping arm 96 with notch 98.

The male contact elements 112 are press-fit into the recesses 114 in the central projection 110 of the male connector housing 104. The control wires 24 extending from the control unit 14 are soldered to the free ends 118 of the male contact elements 112. The hinged strain relief cap 120 is cammed into axial alignment with the body 124 of the male connector housing 104, and then pushed over the soldered connections and latchably secured about the end 144 of the male connector housing 104, whereafter the cap 120 functions as a strain relief for the control wires 24, as well as a protective cover for ends 126 of the male contact elements 112. The crimp ring 132 is compressed about the tubular wiring outlet 134, and the moisture boot 142 is installed about the male connector housing 104.

Upon the mating of the male connector 38 with the female connector 32 and cylindrical projection 36 of the suspension component housing 30, as orientated by the keying surfaces 76 and 78 thereon, the O-ring 156 is compressed between the internal surface 160 of the central cavity 106 of the male connector housing 104 and the external surface 44 of the cylindrical projection 36 of the suspension component housing 30, thereby providing a complete moisture barrier. The fingers 152 of the latches 150 of the male connector 38 engage with the latching surfaces 52 on the cylindrical projection 36, whereby the connector system 26 is firmly, but removably, attached to the suspension component housing 30.

It is to be noted that, although the strut stem 46 is proximately located with the undersurface of the hood of the vehicle (not shown), the low profile of the electrical connector system 26 of the instant invention permits the connection of control wires 24 thereto, notwithstanding the limited clearance available.

It will be appreciated that the location of the rear shocks 20 as shown in FIG. 1 is such that the likelihood of direct water and salt spray on an electrical connector system 26 is much greater than for an underhood suspension component such as a MacPherson strut 18. Additionally, greater protection against gravel, stone, sand, and other foreign objects is required.

An alternate embodiment 170 of the instant invention is illustrated in FIGS. 6-8 as having an external latching cap 172 which fully encompasses both the moisture boot 142 and the male connector housing 104. The latching cap 172, shown in cross-section in FIG. 7 as having only two diametrically opposed, axially extending latches 174 thereon for greater clarity of illustration, is provided with preferably three latches 174 that are positioned about the periphery thereof. After connector system assembly, the latching cap 172 functions as a projectile deflection shield, whereby damage to the connector system 170 is avoided in the event of the impact of a foreign object therewith.

Additionally, the use of the latching cap 172 permits the moisture boot 142 to extend axially of the male connector housing 104 so as to encapsulate the entire male connector housing 104 and engage with an exterior surface 176 of the cylindrical projection 36 of the suspension component housing 30, whereby a second moisture seal is obtained between the male connector 38 and the suspension component housing 30. For easier dissolution of the latch connection, the latch arms 178 are rendered in hook shape, and a clearance 180 is provided on the latching cap 172 between the latch arm 178 and the cap 172 in the direction of pull of the latch connection.

It is to be noted that the use of strain relief means integral to the connector housings, such as hinged strain relief caps 80 and 120 disclosed hereinabove, facilitates connector system assembly while reducing the number of parts which must be individually furnished therefor.

While the preferred embodiment of the invention has been disclosed, it should be appreciated that the invention is susceptible of modification without departing from the spirit of the invention or the scope of the subjoined claims.

We claim:

1. In an electrical control system for an adjustable automobile suspension component, said suspension component comprising
    a housing with cylindrical projection extending outwardly therefrom, the projection having a central bore coaxial therewith; and
    a first set of control wires extending from within said housing;
said electrical control system comprising electrical control means for said suspension component having a second set of control wires extending therefrom, the improvement comprising an electrical connector system for releasably connecting said first and second sets of control wires comprising an axially elongated female connector comprising an electrically insulative female connector housing having a plurality of axially extending electrically conductive contact elements radially outwardly supported by an internal surface thereof and a keying surface located thereon, said first set of control wires being connected to said female connector contact elements, with said female connector being removably secured in the bore of the cylindrical projection of said suspension component housing;

an annular, axially elongated male connector comprising an electrically insulative male connector housing having an axially extending projection, a plurality of axially extending electrically conductive contact elements radially inwardly supported by the axially extending projection, said second set of control wires being connected to said male connector contact elements, said male connector housing having a keying surface thereon engageable with the keying surface of said female connector housing, whereby the orientation between the contact elements of said male and female connectors is prescribed, and a moisture boot encompassing a portion of said male connector housing and interlockingly engaged with an outwardly projecting surface thereof, whereby said moisture boot is retained thereabout;

sealing means radially disposed between said male connector housing and said suspension component housing, whereby a first moisture-proof seal is obtained between said male connector and said suspension component housing; and latch means on said male connector for removably attaching said male connector to said suspension component housing.

2. The electrical control system of claim 1 wherein said contact elements of said female connector are radially outwardly supported in a plurality of axially extending recesses formed in said internal surface of said female connector housing.

3. The electrical control system of claim 1 wherein said contact elements of said male connector are radially inwardly supported in a plurality of axially extending recesses formed in the axially extending projection of said male connector housing.

4. The electrical control system of claim 1 wherein said latch means for removably attaching said male connector to said suspension component housing comprises a plurality of latch connections therebetween.

5. The electrical control system of claim 4 wherein said latch connections comprise a plurality of resiliently yieldable latch arms formed on said male connector housing and engageable with a like number of correspondingly opposed ears formed on said suspension component housing.

6. The electrical control system of claim 4 including an external latching cap encompassing said male connector, and wherein said latch connections comprise a plurality of resiliently yieldable latch arms formed on said external latching cap of said male connector and engageable with an annular, radially outwardly extending flange formed on the cylindrical projection of said suspension component housing.

7. The electrical control system of claim 1 including strain relief means on said female connector for reducing mechanical work on the connections between said first set of wires and said female connector contact elements.

8. The electrical control system of claim 7 wherein said strain relief means on said female connector comprises a hinged cap integral with said female connector housing, the cap being cammed into position axially of said first set of electrical connections so as to be placed in contiguity therewith.

9. The electrical control system of claim 8 wherein the hinged cap of said female connector housing is maintained in contiguity with said first set of wires by a plurality of complementary latching surfaces formed on said female connector housing.

10. The electrical control system of claim 1 including strain relief means on said male connector for reducing mechanical work on the connections between said second set of wires and said male connector contact elements.

11. The electrical control system of claim 10 wherein said strain relief means on said male connector comprises a hinged cap integral with said male connector housing, the cap being pivoted to a position axially of said male connector housing and secured to said male connector housing upon further axial movement of the cap towards said male connector housing, whereby the cap is placed in contiguity with said second set of wires.

12. The electrical control system of claim 11 wherein the hinged cap of said male connector is maintained in contiguity with said second set of wires by a plurality of complementary latching surfaces formed on said male connector housing.

13. The electrical control system of claim 1 wherein said sealing means radially disposed between said male connector and said suspension component housing comprises an O-ring disposed between an external surface of the cylindrical projection of said suspension component housing and an internal surface of an annular, axially extending portion of said male connector housing encompassing the axially extending projection of said male connector housing.

14. The electrical control system of claim 13 wherein said O-ring is retained by a plurality of axially opposed surfaces formed in the axially extending internal surface of said male connector housing.

15. The electrical control system of claim 14 wherein said axially opposed surfaces comprise a circumferential groove formed in the axially extending internal surface of said male connector housing.

16. The electrical control system of claim 14 wherein said axially opposed surfaces comprise axially disposed surfaces on a plurality of radially inwardly extending tabs formed on the axially extending internal surface of said male connector housing.

17. The electrical control system of claim 1 wherein said outwardly projecting surface of said male connector housing engageable with said moisture boot comprises a surface of a cap secured in axial alignment with said male connector housing.

18. The electrical control system of claim 1 wherein said outwardly projecting surface of said male connector housing engageable with said moisture boot comprises a surface of an outwardly projecting tang formed on said male connector housing.

19. The electrical control system of claim 18 including a cap integral with said male connector housing and connected thereto by an outwardly extending peripheral hinge, and wherein said outwardly projecting tang comprises a portion of the hinge after the cap is cammed into axial alignment with said male connector housing.

20. The electrical control system of claim 1 wherein said moisture boot of said male connector extends axially thereof so as to engage with a surface of said suspension component housing, whereby a second moisture-proof seal is obtained between said male connector and said suspension component housing.

21. The electrical control system of claim 1 wherein said female connector is retained in the bore of said suspension component housing by a radially outwardly extending tang on an axially extending, radially inwardly yieldable cantilevered snapping arm formed integrally with said female connector housing, said tang engaging with a correspondingly opposed notch formed internally the bore of said suspension component.

22. An electrical connector system comprising
a first axially elongated, electrically insulative connector housing having a cavity formed in an axially disposed surface thereof wherein a plurality of axially extending metallic contact elements are radially outwardly supported by an internal surface of the cavity;
a second axially elongated, electrically insulative connector housing having a cavity formed in an axially disposed surface thereof wherein an axially extending projection disposed centrally of the cavity radially inwardly supports a plurality of axially extending metallic contact elements, said contact elements supported by said second connector housing engaging said contact elements supported by said first connector housing upon insertion of the central projection of said second connector housing into the cavity of said first connector housing;
a strain relief cap secured to the opposite end of one of said connector housings by complementary latching surfaces thereon so as to contain and engage said cap with a plurality of wires connected to the contact elements supported by said connector housing, whereby mechanical work on said connections due to relative movement between said wires and said connector housing is reduced;
sealing means disposed internally of said central cavity of said second connector housing and retained therein by a plurality of axially disposed surfaces formed in an internal surface of the cavity of said second connector housing; and
a moisture boot encompassing a portion of said second connector housing and interlockingly engaging with an outwardly projecting surface of said second connector housing, whereby said moisture boot is retained thereabout.

23. The electrical connector system of claim 22 wherein said contact elements supported by said first connector housing are radially outwardly supported in a plurality of axially extending recesses formed in said internal surface of said first connector housing.

24. The electrical connector system of claim 22 wherein said contact elements supported by said second connector housing are radially inwardly supported in a plurality of axially extending recesses formed in the central projection of said second connector housing.

25. The electrical connector system of claim 22 wherein said strain relief cap is formed integrally with said connector housing, said cap being connected to said connector housing by a radially outwardly extending peripheral hinge on said connector housing.

26. The electrical connector system of claim 25 wherein said hinged strain relief cap is cammed into axial alignment with said connector housing.

27. The electrical connector system of claim 26 wherein said hinged strain relief cap of said connector housing is moved axially relative to said connector housing subsequent to the axial alignment of the said cap with the opposite end of said connector housing, whereupon said complementary latching surfaces on said cap and said connector housing engage to secure said cap to said connector housing.

28. The electrical connector system of claim 25 wherein said hinge protrudes radially outwardly from said connector housing subsequent to the latching of said cap thereon so as to interlockingly engage with said moisture boot.

29. The electrical connector of claim 22 wherein a surface of said strain relief cap protrudes radially outwardly from said connector housing subsequent to the latching of said cap thereon so as to interlockingly engage with said moisture boot.

30. The electrical connector system of claim 22 wherein said sealing means disposed internally of said central cavity of said second connector housing comprises an O-ring.

31. The electrical connector system of claim 22 including latch means for removably attaching said second connector housing to an automotive suspension component housing having a cylindrical projection extending outwardly therefrom, the projection having a central bore coaxial therewith to receive said first connector housing therein and a plurality of latching surfaces thereon.

32. The electrical connector system of claim 31 wherein said latch means comprises a plurality of resiliently yieldable latch arms formed on said second connector housing, the latch arms being engageable with the latch surfaces of the cylindrical projection of said suspension component housing.

33. The electrical connector system of claim 32 wherein said latch means comprises an external latching cap encompassing said second connector housing and said moisture boot having a plurality of resiliently yieldable latch arms formed thereon, said latch arms being engageable with the latch surfaces of the cylindrical projection of said suspension component housing.

34. The electrical connector system of claim 33 wherein said moisture boot extends axially of said second connector housing so as to engage with a surface of said suspension component housing.

* * * * *